United States Patent [19]

Sanchez et al.

[11] Patent Number: 4,551,319
[45] Date of Patent: Nov. 5, 1985

[54] TWO-STAGE CONCENTRATION FOR SUPERPHOSPHORIC ACID

[75] Inventors: Pierre Sanchez, Grand-Couronne; Pierre Laudat, Franqueville St. Pierre Boos, all of France

[73] Assignee: CdF Chimie Azote et Fertilisants, S.A., Paris, France

[21] Appl. No.: 637,732

[22] Filed: Aug. 6, 1984

[30] Foreign Application Priority Data

Aug. 5, 1983 [FR] France ................................. 8312952

[51] Int. Cl.$^4$ .......................... C01B 25/16; B01D 1/00
[52] U.S. Cl. .................................... 423/316; 423/317; 423/321 R; 159/47.1
[58] Field of Search ................... 423/319, 320, 321 R, 423/321 S, 316, 317; 159/47.1

[56] References Cited

U.S. PATENT DOCUMENTS

| 3,298,783 | 1/1967 | Gruber et al. | 23/165 |
| 3,314,756 | 4/1967 | Myon | 139/47.1 |
| 3,440,010 | 4/1969 | Rushton | 23/165 |
| 3,457,036 | 7/1969 | Backlund | 139/47.1 |

FOREIGN PATENT DOCUMENTS 2083999 12/1971 France .

OTHER PUBLICATIONS

Rushton, W. E., Superphosphoric Acid by Vacuum Concentration, CHEMICAL ENGINEERING PROGRESS, vol. 64, No. 5, May 1968, pp. 68-70.

Primary Examiner—Gregory A. Heller
Attorney, Agent, or Firm—Millen & White

[57] ABSTRACT

A process for the concentration of phosphoric acid by evaporation under vacuum in two stages to produce superphosphoric acid, the pressure inside the exchanger is kept equal to or greater than 0.35 bar higher than that in the evaporator vessel.

8 Claims, 1 Drawing Figure

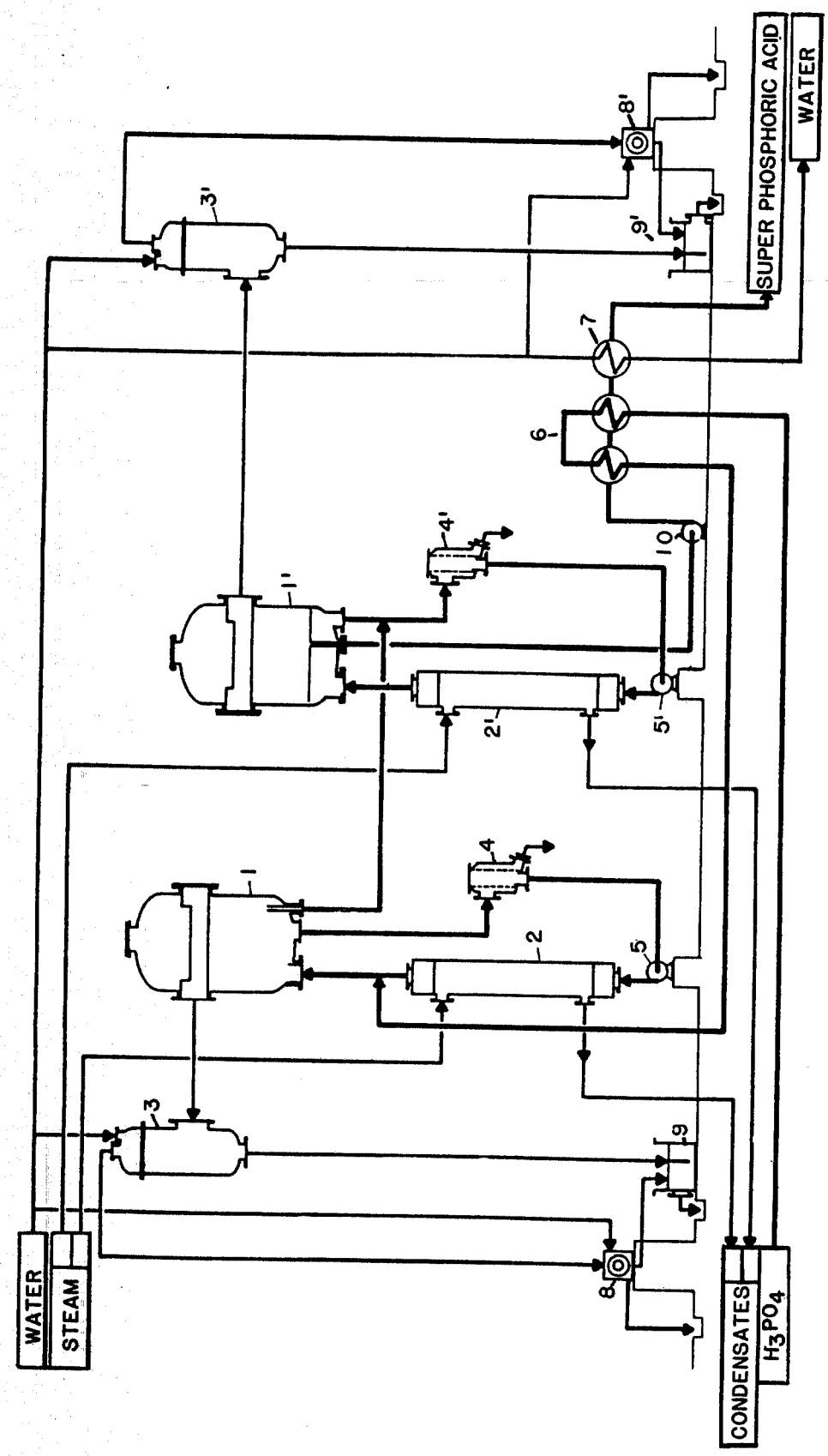

TWO-STAGE CONCENTRATION FOR SUPERPHOSPHORIC ACID

BACKGROUND OF THE INVENTION

This invention relates to an improved process for the manufacture of superphosphoric acid.

Concentrated phosphoric acids are called superphosphoric acids if they have a $P_2O_5$ content of between 68 and 78%, or even more, and contain quantities, which increase with the concentration, of acids obtained by condensation of two or more molecules of orthophosphoric acid with elimination of a water molecule. Industrially, superphosphoric acids are prepared which have a $P_2O_5$ concentration close to 70% and which can go up to 75%.

It is well known that superphosphoric acid, for example at 70% strength, has numerous advantageous properties not possessed by the 54% strength phosphoric acid generally marketed. One of its most significant properties is its sequestering power for solids which would be insoluble in concentrated solution. This property is particularly significant for the transportation of the acid, by boat for example, since the problems caused by the formation of precipitates are eliminated. Furthermore, since the superphosphoric acid is more concentrated, the quantity of water to be transported is smaller.

An important application of superphosphoric acid is in the manufacture of liquid fertilizers.

The superphosphoric acids are prepared by concentration of wet-process phosphoric acid. Various manufacturing processes have been proposed; for example, it has been proposed to use submerged combustion or evaporation by hot gases. However, these types of concentration processes involve significant losses of $P_2O_5$ and give rise to problems of pollution. Moreover, the capacity of a line for manufacturing according to these processes is small.

Various processes for evaporation under vacuum have been proposed, and studies have been carried out on evaporators with long vertical tubes, film evaporators and forced circulation evaporators.

An industrial process for evaporation under vacuum is known in which the wet-process phosphoric acid, optionally preheated, is introduced into an evaporator operating under vacuum, a fraction of the phosphoric acid which issues from the evaporator being recycled to the evaporator by way of a heat exchanger heated by steam under pressure or another heat-transfer fluid. A fraction of the phosphoric acid thus circulates in a closed loop. A second fraction of the phosphoric acid issuing from the evaporator is drawn off and then sent for storage after being cooled.

In this single-stage process, the entire phosphoric acid is heated to a temperature of at least 240° C., which corresponds to the use of steam at an absolute pressure of 30 to 37 bars in the heat exchanger. At these temperatures, there exists no steel able to resist for more than 4 or 5 years the corrosion by the phosphoric acid or, more especially, the corrosion by the byproduct fluorinated derivatives. It is therefore necessary to replace all the components of the installation at least every 5 years, or about 20% depreciation of the installation every year. In view of the prices of the special steels used, maintenance of the installation is a high operating cost. To this high cost are to be added the production losses caused by frequent stoppage of the installation, and losses of $P_2O_5$ resulting from the cleaning and emptying of the different parts of the installation during stoppages.

A process has also been proposed and described in French Pat. No. 2,083,999, Dec. 17, 1971, by Parkson Corporation, the inventorship being Einar Henry Palamson, for the manufacture of superphosphoric acid having a concentration calculated in $P_2O_5$ of close to 70%, and which can go up to 75%, by evaporation of wet-process phosphoric acid having a concentration calculated in $P_2O_5$ preferably between 40 and 54% under vacuum in an installation incorporating an evaporator under vacuum, into which is introduced the phosphoric acid to be concentrated, optionally preheated. A first fraction of acid is drawn off from this evaporator and recycled into the evaporator by way of a heat exchanger heated by a heat-transfer fluid.

According to this process, the concentration is carried out in two stages:

in the first stage, the phosphoric acid is concentrated in a first evaporator under vacuum until it has a $P_2O_5$ content of at least 65%, the heating in the exchanger being performed by means of a heat-transfer fluid having a temperature of 170° to 220° C., a first fraction of the phosphoric acid being recycled into the first evaporator;

in the second stage, the second fraction of the phosphoric acid issuing from the first evaporator is conveyed into a second evaporator where it is concentrated to a concentration greater than 65%, the heating in a second exchanger being performed by means of a heat-transfer fluid at a temperture of 215° to 225° C., the heat-transfer fluid used in the first exchanger being at an absolute pressure of 8 to 16 bars and the heat-transfer fluid used in the second exchanger being at an absolute pressure of 20 to 30 bars. As an important aspect of this process, evaporation is conducted under boiling conditions in the heat exchangers, thereby resulting in considerable turbulence and at a high rate of heat transfer.

Such a process enables superphosphoric acid to be manufactured at high concentrations, but because of the turbulence phenomena in the exchangers, increases the risks of corrosion. Furthermore, since the concentration of the impurities in the phosphoric acid are higher, fouling is caused on the walls of the exchanger, which increases the maintenance expenses.

SUMMARY

An object of the present invention is to provide an improved process for the manufacture of superphosphoric acid which especially limits corrosion and consequently the maintenance costs.

Upon further study of the specification and appended claims, further objects and advantages of this invention will become apparent to those skilled in the art.

To attain these objects, there is provided an improvement in a process for the manufacture of superphosphoric acid having a concentration calculated as $P_2O_5$ of about 70%, and which on occasion can reach 75%, by evaporation of wet-process phosphoric acid having a concentration calculated as $P_2O_5$ preferable between 40 and 54% under vacuum in an installation incorporating a vacuum evaporator into which is introduced the phosphoric acid to be concentrated, optionally preheated beforehand. A first fraction of acid is drawn off from this evaporator and recycled into the evaporator by way of a heat exchanger heated by a heat-transfer fluid, a process according to which the concentration is carried out in two stages:

in the first stage, the phosphoric acid is concentrated in a first evaporator under vacuum until it has a $P_2O_5$ content of 60 to 66%, the heating in the exchanger being performed by means of a heat-transfer fluid having a temperature of 170° to 200° C., a first fraction of the phosphoric acid being recycled into the first evaporator;

in the second stage, the second fraction of the phosphoric acid issuing from the first evaporator is passed into a second evaporator where it is concentrated to a concentration greater than 68%, the heating in a second exchanger being performed by means of a heat-transfer fluid at a temperature of 215° to 225° C., the heat-transfer fluid used in the first exchanger being at an absolute pressure of 8 to 16 bars and the heat-transfer fluid used in the second exchanger being at an absolute pressure of 20 to 30 bars.

The improvement of this invention comprises maintaining the pressure in each stage throughout the phosphoric acid side of the exchanger equal to or greater than 0.35 bar higher than that in the evaporator vessel in the same stage. By the use of this pressure difference, it is ensured that under all conditions, boiling is avoided in the heat exchangers, thereby substantially increasing the useful life of the exchangers and the times between cleanouts.

This pressure difference can be obtained by installing the exchanger sufficiently below the evaporator. Thus, the difference in level between the bottom of the evaporator vessel and the top of the exchanger is preferably at least 1.50 meter. This pressure difference can also be partially obtained by introducing the phosphoric acid which issues from the exchanger into the evaporator vessel by means of a diffuser. This diffuser can consist of a diaphragm or of a device of the "rosehead sprinkler" type: such a diffuser should be submerged. The pressure difference of at least 0.35 bar in the exchanger enables a higher temperature to be maintained in the latter than in the evaporator, without the phosphoric acid boiling in the exchanger. Furthermore, such a pressure difference between the exchanger and the evaporator vessel prevents the phosphoric acid from boiling in the evaporator vessel.

The heat-transfer fluid used to carry out the process of the invention is, in a known manner, most usually saturated steam under pressure: in the first stage steam is used at an absolute pressure of 8 to 16 bars, and in the second stage steam is used at between 20 and 30 bars absolute, and preferably at between 22 and 25 bars absolute.

Like the processes used heretofore, this process enables superphosphoric acids to be prepared having a $P_2O_5$ concentration which can go up to 75%, and is most often between 70 and 72%.

The process according to the present application enables the corrosion phenomena to be reduced, owing to the fact that the heating temperatures of the phosphoric acid used even in the second stage of the two-stage process are lower than in a single-stage process. However, it should be noted particularly that corrosion is practically nil in the first stage. The corrosion phenomanon appears only in the second stage, and even so, less severaly than throughout an entire single-stage facility. Since the second stage represents only about 40% of the entire installation, the maintenance costs of the two-stage process are reduced to less than half those of the single-stage process.

BRIEF DESCRIPTION OF DRAWING

FIG. 1 schematically illustrates a preferred embodiment of this invention.

DETAILED DESCRIPTION

According to the diagram, phosphoric acid is introduced into the facility by way of an exchanger 6 which permits recovery of the heat from the outflow phosphoric acid so as to preheat the phosphoric acid flowing in. (The installation can function without incorporating this exchanger.) The preheated phosphoric acid supply pipeline opens into the phosphoric acid pipeline situated between the exchanger 2 and the evaporator vessel 1. A first fraction of the phosphoric acid is drawn off through a pipeline situated at the bottom of the evaporator vessel 1, and is recycled into the exchanger 2 by way of the pump 5. In the FIGURE, the phosphoric acid-recycling pipeline incorporates a filter 4 which serves to remove precipitated impurities. However, the presence of this filter is not obligatory. The exchanger 2, which is shown vertical in the FIGURE although this arrangement is not essential, is supplied with steam at the top. The condensates formed in the exchanger 2 are discharged at the bottom. The vapors issuing from the evaporator vessel 1 pass into the chamber of the barometric condenser 3 where they are sprayed with water. The condenser 3 is connected to a vacuum pump 8 (this vacuum pump could be replaced by an ejector) which maintains the apparatus under vacuum. In the FIGURE, 9 is the collecting tank of the hydraulic trap of the barometric condenser 3.

The phosphoric acid preconcentrated in the first stage then circulates in a second loop comprising the evaporator vessel 1' and the exchanger 2', and a fraction of the preconcentrated phosphoric acid issuing from the evaporator vessel 1 is placed into the second loop between the evaporator vessel 1' and the filter 4'. This arrangement has the advantage of permitting the passage from one stage to the other to be achieved by means of gravity. The pump 5' ensures the circulation of the acid in the second loop. A fraction of the superphosphoric acid issuing from the evaporator 1' is conveyed to storage by way of the pump 10. The superphosphoric acid traverses the exchanger 6, where it is cooled while heating the phosphoric acid to be treated. The superphosphoric acid can also be cooled by water in the exchanger 7, as shown in the appended FIGURE. The vapors which issue from the evaporator vessel 1' are condensed in a barometric condenser 3' by spraying them with water. As in the first stage, the apparatus 9' is the collecting tank of the hydraulic trap of the hydraulic condenser. The vacuum pump 8' (which could be replaced by an ejector) maintains the vacuum in the second stage.

The exchangers such as shown at 2 and 2' can be of the tube-and-shell, plate or perforated block type or any other type of exchanger of low susceptibility to fouling.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE

In the facility illustrated in the appended FIGURE, there is introduced phosphoric acid at 54% $P_2O_5$ concentration, obtained from Moroccan phosphate. The temperature of the steam introduced into the exchanger 2 is 180° C., at an absolute pressure of 10 bars. The pressure inside the exchanger 2 is 0.444 bar, the post-exchanger temperature being 127° C. The pressure in the evaporator vessel 1 is 0.066 bar. The concentration is $P_2O_5$ of the phosphoric acid drawn off from the evaporator vessel 1 is 63.5%, the temperature of this acid being 132° C.

In the second stage, the steam is introduced into the exchanger 2' at a temperature of 220° C. at an absolute pressure of 23 bars. The pressure inside the exchanger 2' is 0.524 bar, the post-exchanger temperature being 192° C. The pressure in the evaporator vessel 1' is 0.066 bar, and the superphosphoric acid is obtained at a $P_2O_5$ concentration of 70.5%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for the production of superphosphoric acid having a concentration calculated in $P_2O_5$ of up to 75%, by vacuum evaporation of wet-process phosphoric acid having a concentration calculated as $P_2O_5$ of between 40 and 54%, comprising in a first stage, concentrating the phosphoric acid in a first evaporator under vacuum until it has a $P_2O_5$ content of 60 to 66%, and heating in a first heat exchanger under vacuum conditions, said heating being performed by means of a heat-transfer fluid having a temperature of 170° to 200° C., withdrawing a partially concentrated phosphoric acid from said first stage, forming first and second fractions therefrom, and recycling said first fraction into the first evaporator, and in a second stage, passing the second fraction of the phosphoric acid issuing from the first evaporator into a second evaporator, and concentrating said second fraction to a concentration greater than 68%, the heating in a second heat exchanger being performed under vacuum conditions and by means of a heat-transfer fluid at a temperature of 215° to 225° C., the improvement which comprises maintaining the pressure in each stage throughout the phosphoric acid side of the heat exchanger equal to or greater than 0.35 bar higher than that in the evaporator vessel in the same stage.

2. A process according to claim 1, wherein said pressure difference of 0.35 bar is accomplished at least in part by placement of the heat exchanger below the evaporator vessel.

3. A process according to claim 1, wherein said pressure difference of 0.35 bar is accomplished at least in part by passing the phosphoric acid issuing from the heat exchanger into the evaporator vessel by means of a diffuser.

4. A process according to claim 2, wherein said pressure difference of 0.35 bar is accomplished at least in part by passing the phosphoric acid issuing from the heat exchanger into the evaporator vessel by means of a diffuser.

5. A process according to claim 2, wherein the placement of the top of the heat exchanger is at least 1.5 meters below the bottom of the evaporator vessel.

6. A process according to claim 1, wherein said pressure difference is 0.35 bar.

7. A process according to claim 1, wherein the heat-transfer fluid used in the first heat exchanger being at an absolute pressure of 8 to 16 bar and the heat transfer fluid used in the second heat exchanger being at an absolute pressure of 20 to 30 bar.

8. In a process for the production of superphosphoric acid having a concentration calculated in $P_2O_5$ of up to 75%, by vacuum evaporation of wet-process phosphoric acid having a concentration calculated as $P_2O_5$ of between 40 and 54%, comprising in a first stage, concentrating the phosphoric acid in a first evaporator under vacuum until it has a $P_2O_5$ content of 60 to 66%, the heating in a heat exchanger being performed by means of a heat-transfer fluid having a temperature of 170° to 200° C., withdrawing a partially concentrated phosphoric acid from said first stage, forming first and second fractions therefrom, and recycling said first fraction into the first evaporator, and in a second stage, passing the second fraction of the phosphoric acid issuing from the first evaporator into a second evaporator, and concentrating said second fraction to a concentration greater than 68%, the heating in a second heat exchanger being performed by means of a heat-transfer fluid at a temperature of 215° to 225° C., the improvement which comprises maintaining the pressure in each stage throughout the phosphoric acid side of the exchanger equal to or greater than 0.35 bar higher than that in the evaporator vessel in the same stage, wherein the pressure difference is accomplished at least on part by placement of the heat exchanger below the evaporator vessel, and wherein the heat-transfer fluid used in the first heat exchanger being at an absolute pressure of 8 to 16 bar and the heat exchanger being at an absolute pressure of 20 to 30 bar.

* * * * *